United States Patent
Bellows

(10) Patent No.: US 7,660,246 B2
(45) Date of Patent: Feb. 9, 2010

(54) METHOD AND APPARATUS FOR SCALING INPUT BANDWIDTH FOR BANDWIDTH ALLOCATION TECHNOLOGY

(75) Inventor: Mark David Bellows, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 11/733,218

(22) Filed: Apr. 10, 2007

(65) Prior Publication Data

US 2007/0183327 A1 Aug. 9, 2007

Related U.S. Application Data

(62) Division of application No. 10/255,513, filed on Sep. 26, 2002, now Pat. No. 7,283,562.

(51) Int. Cl.
*G01R 31/08* (2006.01)

(52) U.S. Cl. ............... 370/230; 370/235; 370/395.41; 370/468; 370/395.21; 370/477

(58) Field of Classification Search ......... 370/229–240, 370/395.41, 468, 395.21, 477
See application file for complete search history.

(56) References Cited

U.S. PATENT DOCUMENTS

| | | | | |
|---|---|---|---|---|
| 5,463,422 A | * | 10/1995 | Simpson et al. | 348/390.1 |
| 5,784,047 A | * | 7/1998 | Cahill et al. | 345/660 |
| 6,577,769 B1 | * | 6/2003 | Kenyon et al. | 382/239 |
| 7,058,678 B2 | * | 6/2006 | Luick | 708/670 |

* cited by examiner

*Primary Examiner*—Jason E Mattis
*Assistant Examiner*—Kibrom T Hailu
(74) *Attorney, Agent, or Firm*—Joan Pennington

(57) ABSTRACT

A method and apparatus are provided for scaling an input bandwidth for bandwidth allocation technology. An original bandwidth count value of an input flow is received. A bandwidth scaler constant is provided and used for scaling the received original bandwidth count value to provide a scaled bandwidth value between zero and one. The scaled bandwidth value is stored and used for calculating a transmit probability for the input flow.

5 Claims, 4 Drawing Sheets

PRIOR ART

If Fi <= mini, then Ti(t + Dt) = min(1, Ti(t) + 0.125)

else if (Fi > maxi) then Ti(t + Dt) = 0.875*Ti(t)

else if B = 1 Ti(t + Dt) = min(1, Ti(t) + Ci*E(t))

else Ti(t + Dt) = max(0, Ti(t) - Di*Fi(t))

METHOD AND APPARATUS FOR SCALING INPUT BANDWIDTH FOR BANDWIDTH ALLOCATION TECHNOLOGY

This application is a divisional application of Ser. No. 10/255,513 filed on Sep. 26, 2002.

FIELD OF THE INVENTION

The present invention relates generally to the data processing field, and more particularly, relates to a method and apparatus for scaling an input bandwidth for bandwidth allocation technology.

DESCRIPTION OF THE RELATED ART

FIG. 1 illustrates a conventional switch or router used in a computer network. Congestion avoidance is a function that is provided in order to help computer networks deal with periods of time when there is not enough bandwidth to send all messages between computer systems. Congestion occurs, for example, if a router connects more than one input systems to more than one output system and all input systems are trying to communicate with a single output line, as shown in FIG. 1.

In FIG. 1, if inputs one through five are trying to send messages to one output line, such as output four, and if buffering capability of the router cannot hold all of the incoming messages, then some of the incoming messages will need to be dropped.

The simplest but least desirable is to tail drop meaning that frames are dropped when the buffer is full. All frames in a row are dropped until the buffering is freed up enough so that the router can begin receiving.

The preferred method of handing such over subscription is to randomly drop packets according to some drop probabilities. Various methods have been proposed over the years to deal with drop probabilities. One method still in use today is known as Random Early Discard (RED). By setting system parameters which must be set up before congestion occurs, a drop probability can be created.

Another commonly used and improved method is known as Weighted Random Early Discard. The Weighted Random Early Discard method attempts to provide some improvements over RED by allowing some lines or paths higher priority without dropping packets from multiple sources. Again, a manual approach is used in setting up the system to handle the drop probabilities. Both methods employ threshold monitoring and then a drop rate supplied by the system administrators are applied.

International Business Machines Corporation of Armonk, N.Y. has developed a more recent method called Bandwidth Allocation Technology. The Bandwidth Allocation Technology (BAT) method provides an automatic system to deal with allocating the bandwidth resources of a chip or system based upon the system utilization. The BAT method applies control theory to create an automatic system that reacts to congestion.

FIG. 2 illustrates the more recent algorithm called Bandwidth Allocation Technology together with hardware for implementing dynamic congestion control in the switch or router of FIG. 1. The BAT method uses feedback of the number of bytes transmitted through the router, together with controlling constants, and creates a function that computes the desired Ti, the transmit probability or transmit ratio for a given flow. The BAT algorithm has the characteristics that when congestion occurs, the flow will see a reduction in its transmit probability Ti. When congestion is over, the transmit rate rises back to 100% when no further congestion is encountered.

FIG. 2 provides the formula used to determine Ti, the transmit probability for a given flow as follows:

if $Fi <= mini$ then $Ti(t+Dt) = \min(1, Ti(t)+0.125)$ else if($Fi > maxi$) then $Ti(t+Dt) = 0.857 * Ti(t)$ else if $B=1$ $Ti(t+Dt) = \min(1, Ti(t)+Ci*E(t))$ else $Ti(t+Dt) = \max(0, Ti(t)-Di*Fi(t))$ The value Fi represents the amount of bytes transmitted for any given line or channel i input to the router.

Ti is the transmit probability for any given input i. Ti(t+Dt) represents the transmit rate for a next period that starts after the computation is performed. Ti(t) represents the previous transmission rate, for what was just being transmitted. The transmit probability Ti is a value between 0 and 1. Mini represents a lower limit or guaranteed level where the transmit probability Ti will not be reduced. The bytes transmitted over a sample time value Fi is compared with the mini value to determine whether the flow is below the lower limit or guaranteed level.

Maxi represents an upper limit or a maximum number of bytes that the channel can transmit. The bytes transmitted over a sample time value Fi is compared with the maxi value to determine whether the flow is above the upper limit or maximum level. If a channel exceeds this number, then the transmit rate for the channel is decreased.

B represents a control signal for excess bandwidth. If the routing device is not seeing congestion, then value B is set to true or one. Packets are allowed to flow in and out without any packets being dropped. However, when congestion is detected, then the value B is set to zero.

Ci represents a constant of increase and is used when an input flow is between minimum and maximum and there is no congestion. Ci is used to allow additional packets into the system. The value E represents a history of excess bandwidth and is a value between 0 and 1. If the router is congested for only a short period of time, E will be close to one. However, if congestion has occurred over a long period of time, E will be near or at zero.

Di represents a discard coefficient or constant of decrease and is used to decrease the amount of packets entering the system during congestion. The value Dt is a complex number taking bytes into a percentage of bandwidth used for a given flow. The discard coefficient Di has a wide range of values containing a scaling value and an exponential value. The multiply of Di*Fi(t) requires a large number of bits and the complexity of an exponent requiring floating point and exponent capabilities.

A need exists for an improved mechanism for implementing bandwidth allocation technology. It is desirable to provide such improved mechanism for implementing bandwidth allocation technology that simplifies calculations, for example, that eliminates the need for a discard coefficient to contain both scaling and exponential value.

SUMMARY OF THE INVENTION

A principal object of the present invention is to provide a method and apparatus for scaling an input bandwidth for bandwidth allocation technology. Other important objects of the present invention are to provide such method and apparatus for scaling the input bandwidth for bandwidth allocation technology substantially without negative effect and that overcome many of the disadvantages of prior art arrangements.

In brief, method and apparatus are provided for scaling an input bandwidth for bandwidth allocation technology. An original bandwidth count value of an input flow is received. A bandwidth scaler constant is provided and used for scaling the received bandwidth count value to provide a scaled bandwidth value between zero and one. The scaled bandwidth value is stored and used for calculating a transmit probability for the input flow.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 3:
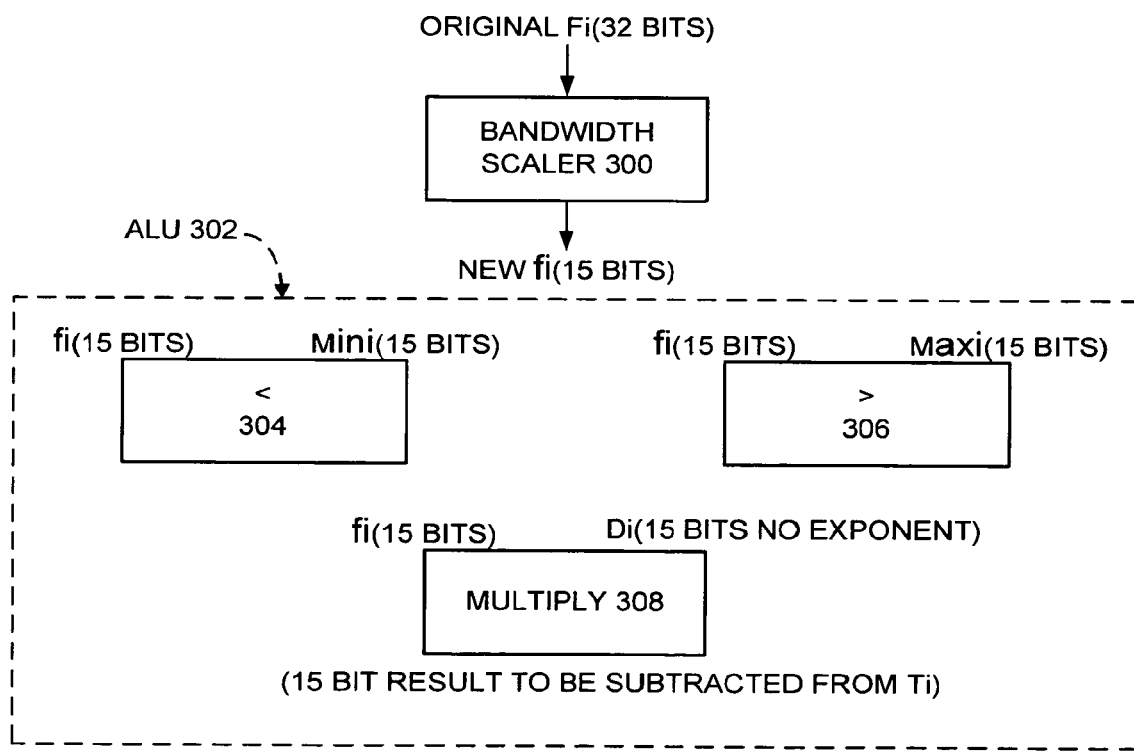
FIG. 3 is a flow diagram illustrating a method for scaling input bandwidth for bandwidth allocation technology in accordance with the preferred embodiment.

Having reference now to the drawings, FIG. 3 illustrates the method for scaling input bandwidth for implementing bandwidth allocation technology in accordance with the preferred embodiment. In accordance with features of the invention, the bandwidth allocation technology (BAT) algorithm is simplified by performing a scaling of an original bandwidth value Fi to provide a scaled bandwidth value fi before performing the three BAT functions using the scaled bandwidth value fi. The scaled bandwidth value fi is used in the compares with the Mini and Maxi values, and is used to decrease the previous transmit probability by the multiplication of Di*fi, where Di is the constant of decrease. Pre-scaling the original bandwidth value Fi to the scaled bandwidth value fi between 0 and 1 allows Dt to be just the desired exponential decrease and the calculation of the transmit probability can be contained in a smaller number of bits without having Di contain an exponent.

First an original bandwidth value Fi, for example, a 32-bit value is applied to a bandwidth scaler 300 of the preferred embodiment and is scaled into a scaled bandwidth value between 0 and 1 represented by a 15-bit value fi. Using the scaled bandwidth value fi, provides hardware simplifications and savings in required memory for storing the constants Mini, Maxi, and Di. The values of Mini and Maxi are scaled and stored as 15-bit values. The Di value is represented by a 15-bit value with no exponent. The scaled bandwidth value fi is applied to an arithmetic logic unit 302 for implementing the simplified BAT method enabled by the preferred embodiment.

As indicated in a < compare function 304, the scaled bandwidth value fi is compared with the Mini value, where the Mini value is the guaranteed or minimum amount of bandwidth that can be used before any traffic will be discarded. The scaled bandwidth value fi is compared with the Maxi value to determine if more bytes transmitted than permissible as indicated in a > compare function 306. The scaled bandwidth bandwidth value fi is multiplied with the discard coefficient Di as indicated in a multiple function 308. The discard coefficient Di is simplified and represented by a 15-bit value with no exponent. The discard coefficient Di multiplication with the scaled bandwidth value fi is simplified without requiring a multiplication of a large number of bits or the complexity for Di including an exponent as required by the prior art implementation.

Figure 1:
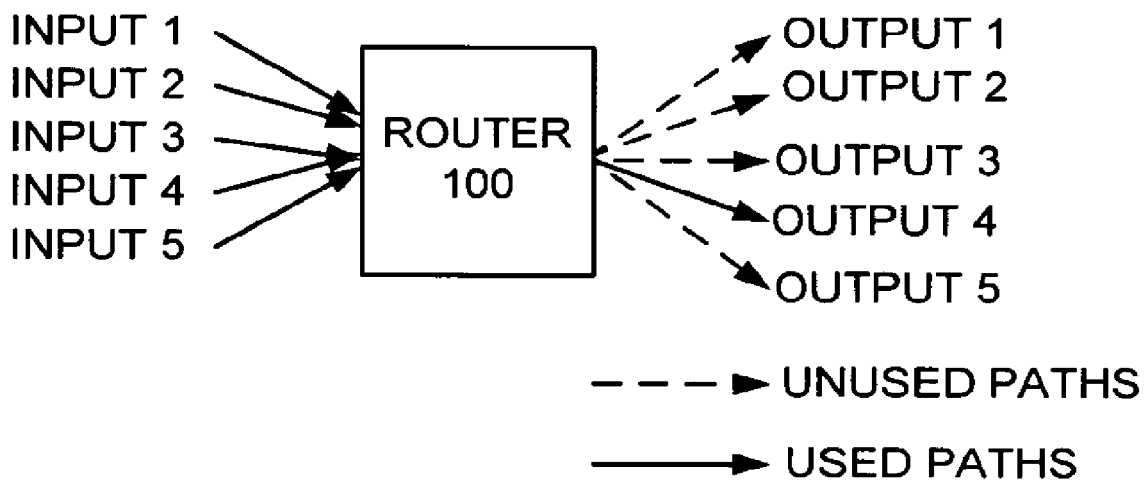
FIG. 1 illustrates a conventional switch or router that may be used in a computer network.
Figure 2:
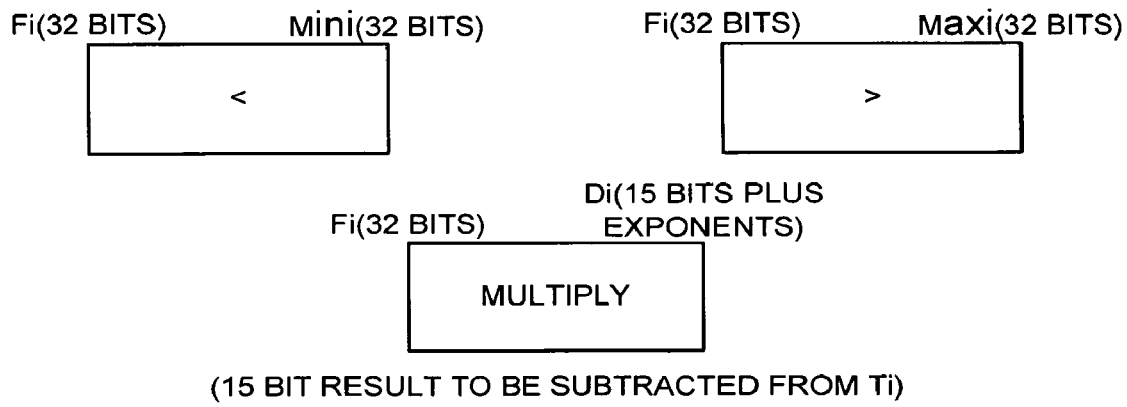
FIG. 2 illustrates a more recent algorithm called Bandwidth Allocation Technology or BAT together with hardware for implementing dynamic congestion control in the switch or router of FIG. 1.
Figure 4:
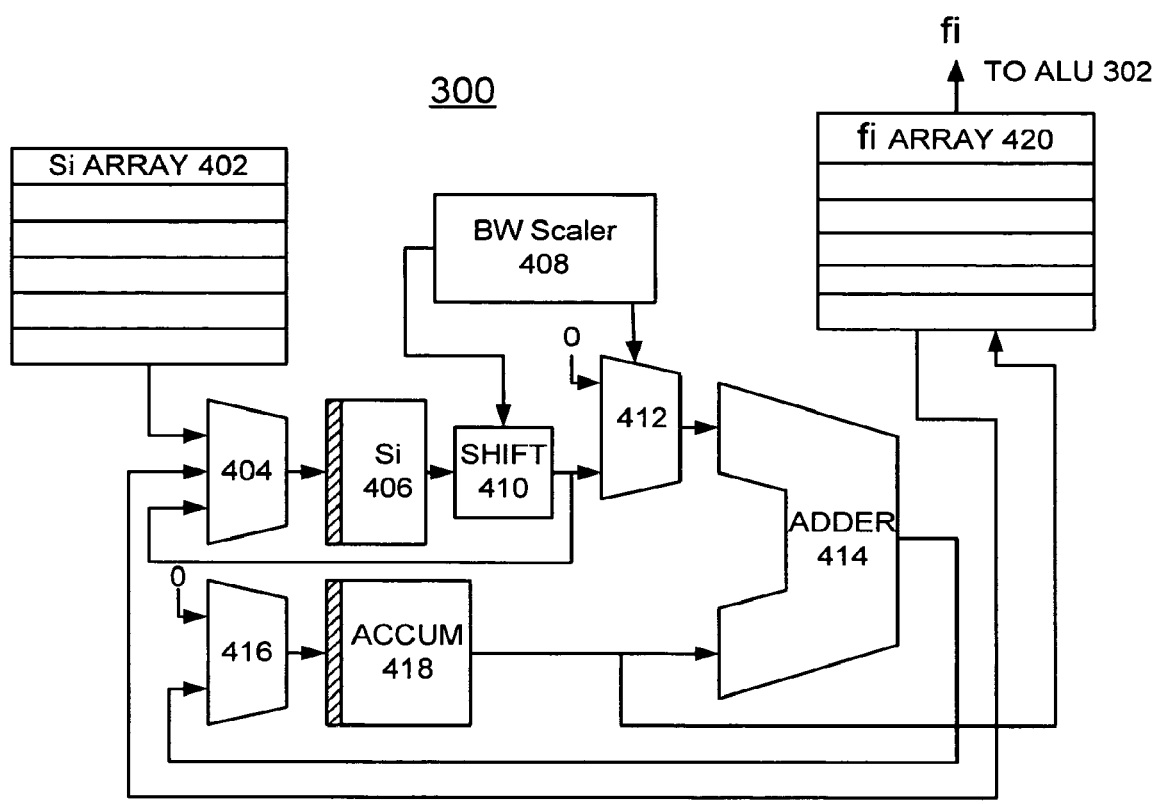
FIG. 4 is a schematic and block diagram illustrating apparatus for scaling input bandwidth for bandwidth allocation technology in accordance with the preferred embodiment.

Referring to FIG. 4, there is shown an exemplary apparatus for implementing bandwidth scaler 300. A Si array 402 contains the count of the number of bytes transmitted on different channels i for a sample period. In the prior art implementation of FIG. 2, these are raw counts are used to compare against the Mini and Maxi values and multiplied against Di. Si array 402 is coupled to a first input of a three-input multiplexer 404. A first Si register 404 is coupled to the output of the multiplexer 404. A BW scaler register 408 provides a scaling constant used to convert the 32-bit value to a 15-bit value between zero and one. The resulting 15-bit scaled bandwidth value fi is easier to use in the ALU 302. ALU 302 does not need to have floating point and exponent capabilities. BW scaler register 408 is coupled to a shift 410 and a multiplexer 412 providing, for example, a shift value (bits 0 to 4) and a fraction, bits 16 to 31. The output of shift 410 is applied an input of the multiplexer 412 and to a second input of the multiplexer 404. The output of multiplexer 412 is applied to an adder 414 providing an adder output. The adder output is applied to an accumulator register 418 via a two-input multiplexer 416. The adder output is applied to a first input of multiplexer 416. Multiplexer 416 has a second zero input for initially loading the accumulator register 418 with a zero value. The accumulator register 418 is coupled to a second input of adder 414 and to a fi array 420 for storing the resulting scaled bandwidth values fi for use by ALU 302 in calculating the transmit probabilities Ti. The fi array 420 provides a previous value of fi to a third input to the three-input multiplexer 404.

By using a second scaler constant in the BW scaler register 408 and using the previous value of fi, bandwidth scaler 300 has additional capability of providing an Exponentially Weighted Averaging of fi, which may be desired where the instantaneous utilization of a link or input i needs to be smoother out. The bandwidth scaler 300 converts Si (what would have been know as Fi) into the scaled fi including the following steps. Optionally the last value of fi is taken from the fi array 420 and the second scaler constant of the BW scaler register 408 is used to scale the previous fi for Exponentially Weighted Averaging of fi. The original bandwidth count value of Si is taken from the Si array 402 and is scaled and added to the optional EWA of fi. The new fi is stored in the fi array 420 for use by ALU 302 in calculating the transmit probabilities Ti.

It should be understood that any loss in precision occurring as a result of the scaling is not significant in view of the calculations otherwise performed. The following Table 1 illustrates exemplary settings for the BW scaler register 408 given a sample time of 2.7 ms. Sampling faster will result in additional precision and different settings.

TABLE 1

| Speed Name | Line Rate | | Suggested Bandwidth Scaler Value | Minimum Resolution | |
|---|---|---|---|---|---|
| DS1 | 1.544 | Mbps | Not suggested | N/A | |
| DS3 | 44.736 | Mbps | 0xd0004572 | 1,365.38 | bps |
| OC-1 | 51.840 | Mbps | 0xc00077db | 1,582.08 | bps |
| SMII | 100.0 | Mbps | 0xb0007c45 | 8,051.85 | bps |
| OC-3 | 155.250 | Mbps | 0xb000500c | 4,738 | bps |
| OC-12 | 622.080 | Mbps | 0x90004fc8 | 18,985 | bps |
| GMII | 1.00 | Gbps | 0x8000636b | 30,518.5 | bps |

While the present invention has been described with reference to the details of the embodiments of the invention shown in the drawing, these details are not intended to limit the scope of the invention as claimed in the appended claims.

What is claimed is:

1. A method for implementing bandwidth allocation technology in a computer network router, the computer network router performing said method comprising the steps of:
   receiving an original bandwidth count value of an input flow;
   providing a bandwidth scaler constant;
   scaling said received original bandwidth count value using said bandwidth scaler constant to provide a scaled bandwidth value between zero and one; said scaled bandwidth value being a fractional value represented by a smaller number of bits than said original bandwidth count value;
   storing said scaled bandwidth value;
   applying said stored scaled bandwidth value to an arithmetic logic unit, and
   using said stored scaled bandwidth value in said arithmetic logic unit, calculating a transmit probability for said input flow; and using said calculated transmit probability to control a transmit rate of the input flow.

2. A method for implementing bandwidth allocation technology as recited in claim 1 wherein the steps of providing said bandwidth scaler constant; and scaling said received original bandwidth count value using said first bandwidth scaler constant to provide said scaled bandwidth value includes the steps of processing said received original bandwidth count value including a first number of bits and providing said scaled bandwidth value including a second number of bits; said second number of bits including one-half of said first number of bits.

3. A method for implementing bandwidth allocation technology as recited in claim 1 wherein the steps of providing said bandwidth scaler constant; and scaling said received original bandwidth count value using said first bandwidth scaler constant to provide said scaled bandwidth value includes the steps of processing said received original bandwidth count value including a 32-bit value and providing said scaled bandwidth value including a 15-bit value.

4. A method for implementing bandwidth allocation technology as recited in claim 1 wherein the steps of scaling said received original bandwidth count value using said first bandwidth scaler constant to provide said scaled bandwidth value further includes the steps of providing a second scaler constant; and utilizing a last stored scaled bandwidth value; and scaling said last stored scaled bandwidth value using said second scaler constant to provide an exponentially weighted average bandwidth value.

5. A method for implementing bandwidth allocation technology as recited in claim 4 includes the steps of adding said exponentially weighted average bandwidth value and said scaled bandwidth value to provide a new value for said scaled bandwidth value.

* * * * *